March 18, 1930. B. F. WATKINS 1,751,376
COTTON PICKER
Filed Dec. 23, 1925 3 Sheets-Sheet 1

Inventor:
Benjamin F. Watkins.
by his Attorneys
Howson & Howson

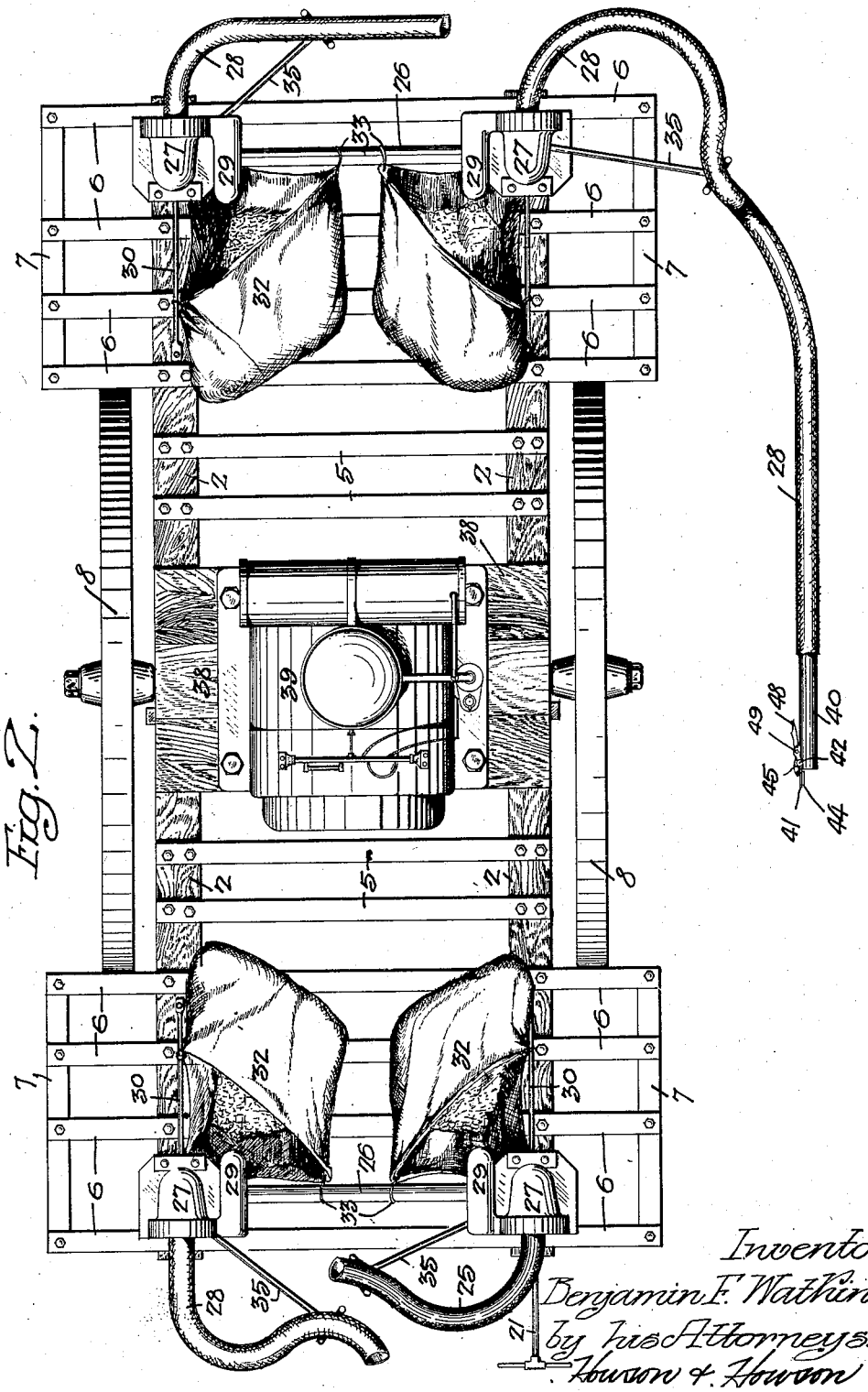

March 18, 1930.  B. F. WATKINS  1,751,376
COTTON PICKER
Filed Dec. 23, 1925  3 Sheets-Sheet 3
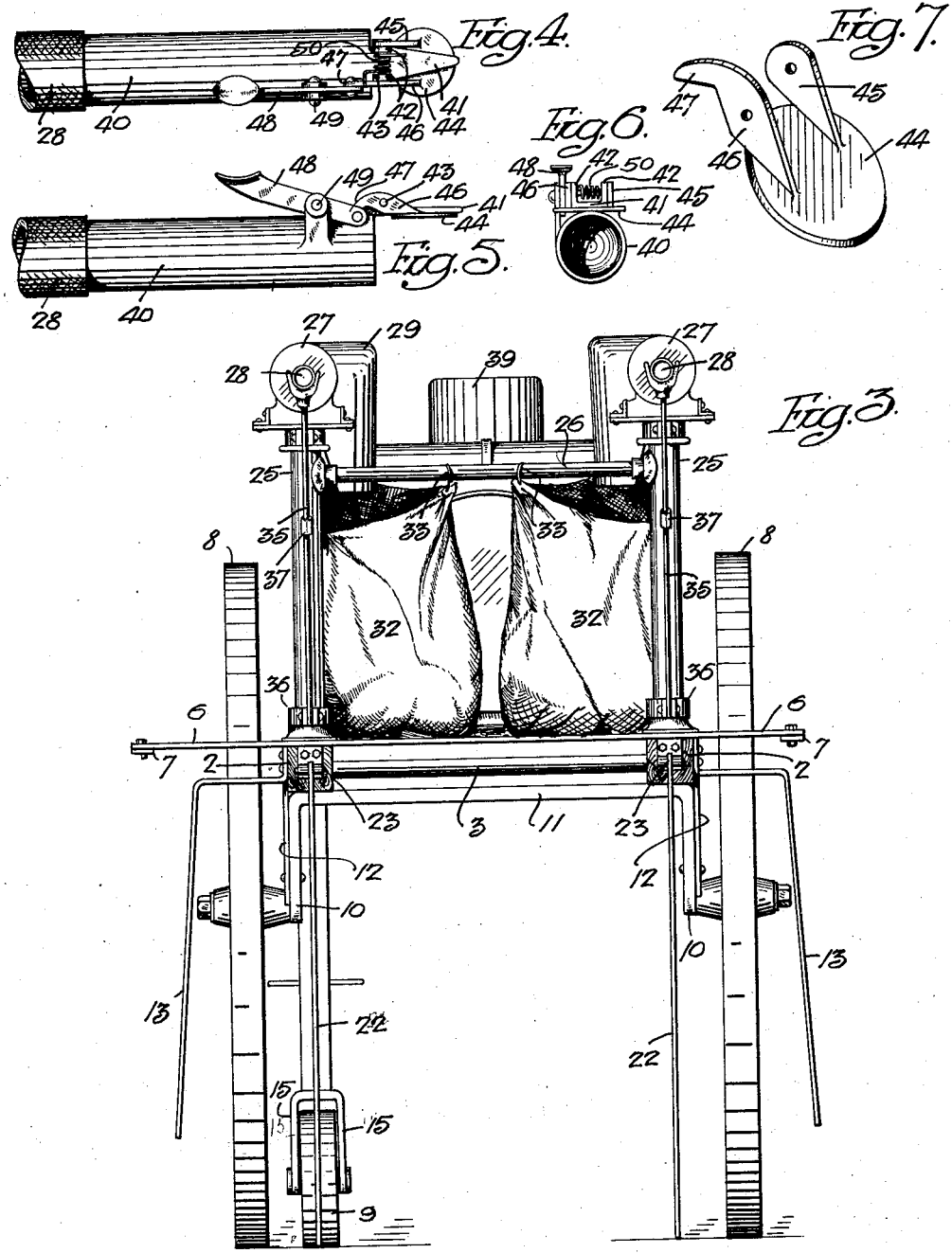

Patented Mar. 18, 1930

1,751,376

UNITED STATES PATENT OFFICE

BENJAMIN F. WATKINS, OF PHILADELPHIA, PENNSYLVANIA, ASSIGNOR TO ELECTRIC COTTON PICKER CO., INC., OF PHILADELPHIA, PENNSYLVANIA, A CORPORATION OF PENNSYLVANIA

COTTON PICKER

Application filed December 23, 1925. Serial No. 77,332.

This invention relates to a machine for picking cotton from the bolls in the field, and the primary object of the invention is to provide relatively simple and efficient means materially facilitating the picking operation. More specifically the object of the invention is to provide an entirely practicable cotton picking machine operating on the suction principle which may be drawn through the cotton fields, and by means of which the cost of picking cotton by hand may be materially reduced.

In the attached drawings in which I have illustrated a machine made in accordance with my invention:

Fig. 2 is a plan view of the machine;

Fig. 3 is an end elevation of the machine;

Figs. 4 and 5 are respectively plan and side views of the suction nozzle and the associated valve;

Fig. 6 is a front view of the nozzle looking directly into the end thereof, and

Fig. 7 is a detached perspective view illustrating details of the valve.

Figure 1:
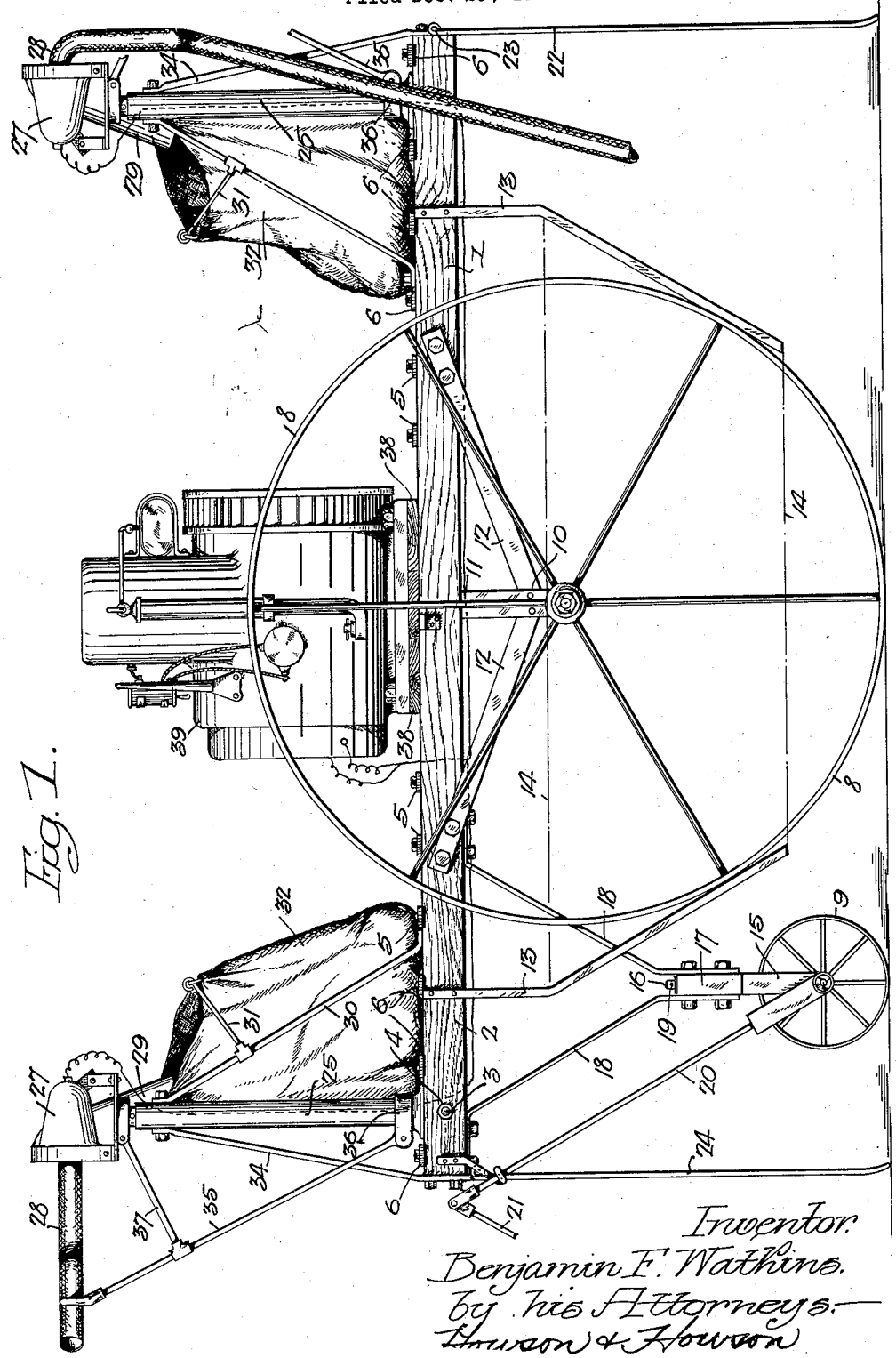
Figure 1 is a side elevation of the machine.

Referring to the drawings, the machine comprises a frame 1 consisting of two longitudinal side bars 2, 2, see Fig. 2, secured together at each end by a transverse rod 3. The reduced and threaded ends of the rod 3 extend through the side beams and are secured on the outside of the beams by means of nuts 4, see Fig. 1. This frame is further reinforced by means of transverse bars or strips 5 which are bolted to the tops of the side bars 2, the series of bars at each end of the frame being extended beyond the sides of the cross bars, as indicated at 6, the outer extremities of these extensions 6 being joined by longitudinal pieces 7. This frame, as clearly illustrated, is mounted on wheels 8, 8, and 9, the wheels 8 being of large diameter and being journaled on the depending ends 10 of a substantially U-shaped axle 11, the latter being secured to the under side of the frame at substantially the middle thereof. The depending ends 10 of this axle are reinforced and held rigid by means of struts 12, 12 at each side which extend transversely downwardly from the frame 1 and attach to the said depending axle ends. It will be noted that by employing wheels of large diameter and the offset axle formation, a maximum clearance is provided beneath the frame so that the latter amply clears the tops of the cotton plants. In order to protect the cotton plants from the wheels 8, I provide arms 13, 13, at front and rear of each of the wheels 8, said arms depending from the frame 1 outwardly of the wheels and being adapted to hold a canvas or other strip 14, indicated in Fig. 1 in broken lines, which prevents the cotton plants being caught in the spokes of the wheels and being crushed.

The wheel 9 is mounted below one end of the frame 1, which I shall call the forward end, and is movable about a vertical axis. The wheel is journaled between the branches 15, 15, of a member having a vertical upwardly extending spindle 16 journaled in a bearing block 17, which latter is secured between the lower ends of two arms 18, 18, secured to the under side of and depending from the frame 1. As illustrated in Fig. 1, the spindle 16 projects through the block 17 and is secured therein by means of a pin 19. A steering rod 20 is also provided for this wheel, said rod having at its outer end a handle 21. It will be noted by reference to Fig. 3 that the wheel 9 directly underlies one of the longitudinal bars of the frame 1 and runs close to the track of the large wheel 8 on that side of the frame. As stated before, the function of this wheel 9 is primarily to direct the carriage as it is drawn through the field.

In order to lend stability to the carriage due to the possibility of the latter tipping in any direction, I provide a pair of supporting legs 22, these being in the form of rigid rods hinged at 23 to the ends of the respective side bars 2 in such manner as to permit them to swing rearwardly around the pivot as the carriage is moved in a forward direction. These legs, however, always occupy a position preventing the rearward tipping of the carriage. I also provide at the front a similar leg also hinged which is secured to the front of the side beam on the side opposite that under which the wheel 9 lies. This leg 24 prevents the possibility of tipping at the front.

It will be noted that the weight of the carriage as described above is reduced to a minimum, and that the construction is such as to make it possible to draw the carriage through a cotton field without unduly damaging the cotton plants.

Supported at each corner of the frame extending upwardly therefrom is a standard 25, the two standards at each end being secured together and reinforced by means of a cross bar 26 extending between the tops of the standards. Pivotally mounted at the top of each standard so as to be capable of turning about a vertical axis is a suction element 27 consisting of a suitable fan or blower of well known type and an electric motor for actuating this fan. These parts are, as is customary, enclosed in a casing comprising an intake port, from which in the present instance extends a flexible pipe or duct 28, and a discharge port from which a short duct 29 extends downwardly and inwardly of the carriage to a point somewhat below the cross bars 26. The motor, fan and casing constitute a unit of well known form, and may be in general similar to those used in commercial vacuum cleaners. Extending inwardly towards the middle of the carriage from each standard 25 is a strut 30 which both supports or reinforces the standards 25 and also provides means through an arm 31 projecting therefrom for supporting a bag 32 in position below the duct 29, as clearly illustrated, this bag being supported in part by the transverse bars 26 extending between the blowers. Suitable clips 33 on the latter bars and at the outer ends of the rods 31 provide means for gripping the upper edge of the bag and supporting it in proper position to receive the cotton passing through the discharge duct 29. The standards 25 are further reinforced by struts 34 extending from the tops of the standards on the outside to the ends of the frame 1. The arrangement is such that the suction elements 27 are freely movable on their vertical axes at the tops of the standards 25, giving free play to the hose 28 which extends from the intake ports, and in order to support the hose adjacent the carriage and to prevent them from being fouled on the carriage parts, I provide in each instance a supporting bracket in the form of an arm 35 extending diagonally upward from a sleeve 36 loosely mounted at the base of the standards 25, the arm 35 being supported intermediate its ends by a rod 37 extending from the under side of the casing 27 of the suction unit to the arm 35. The upper end of the latter arm is provided with a crotch in which the hose 28 rests. It will be noted that by reason of the loose collar 36 at the bottom of the standard, this supporting bracket turns freely with the casing 27.

In order to provide the necessary power to the electric motors operating the suction elements, I mount at or near the center of the frame 1 and upon a platform 38 a power plant in the form of a motor generator set, the motor being preferably in the form of an internal combustion engine. This set I have designated by the reference numeral 39, and it may take any desired form, and may consist of one of the motor-generator sets which may be bought at the present time on the open market. The generator is connected by suitable wiring to the motors in the casings 27 which operate the suction elements.

The ducts 28 are adapted to be directed to the cotton bolls in such manner that the cotton is drawn by the suction of the fans in the suction units 27 and deposited in the bags 32, as previously described. For the purpose of facilitating the manipulation of the hose 28, I provide at the outer end of each a nozzle 40 so constructed as to render it particularly well adapted for presentation to the cotton boll so that the cotton may be withdrawn. On the outer end of the nozzle 40, as shown in Figs. 4 and 5, I provide a valve device which provides for closing the end of the duct when this is desirable. Means is also provided for loosening the cotton at the base of the boll so that it may be drawn into the pipe by the suction. In the preferred form, the nozzle is extended at the top in the form of a triangular tongue or projection 41, and this tongue carries near its base lugs 42 projecting outwardly therefrom in which are secured the ends of a shaft 43 upon which the valve proper or cap 44 is pivotally mounted. This cap 44, as shown in Fig. 7, comprises two perforated lugs 45 and 46 through which the shaft 43 extends, and the lug 46 is extended rearwardly at 47. This extension is in position to be engaged by a pin on one end of an operating lever 48 pivotally mounted at 49 on the nozzle. A spring 50 on the shaft 43 functions to maintain the valve normally in the open position, as shown in the drawings. When the inner end of the lever 48 is depressed, however, the valve is forced downwardly over the open end of the duct. The triangular projection 41 may be used either with the valve open or closed to loosen the cotton in the base of the bolls, after which the open end of the nozzle is applied to the boll and the cotton withdrawn. In manipulating the nozzles 40, the operator is free to draw the hose tight in any direction, the casing of the suction unit 27 and the support 35 adjusting themselves automatically to the direction in which the hose is drawn. As the bags are filled, they are quickly replaced by empty bags.

I claim:

1. In a cotton picker, the combination with a mobile carriage, of a source of electrical power mounted on the carriage, an electrically operated suction device also mounted on the carriage and movable on a vertical axis and operatively connected with the said source of power, and a flexible duct connected with said suction device.

2. In a cotton picker, the combination with a mobile carriage, of a source of electrical power mounted on the carriage, a plurality of standards on the carriage, an electrically operated suction device on each standard mounted for pivotal movement on a vertical axis, said suction devices being operatively connected with the said source of power, and a flexible duct connected with each suction device.

3. In a cotton picker, the combination with a mobile carriage, of a source of electrical power mounted on the carriage intermediate the ends thereof, an electrically operated suction device mounted at each corner of the carriage for pivotal movement on a vertical axis, said devices being operatively connected with the source of power, and a flexible duct connected with each of said suction devices.

4. A cotton picker comprising a mobile carriage, a source of electrical power mounted on the carriage, a plurality of electrically operated suction devices mounted in elevated positions upon the carriage and adapted for pivotal movement about a vertical axis, said suction devices being operatively connected with the source of power and each comprising its own intake and discharge port, means for applying the suction produced in said devices at points distant therefrom, and means for supporting a container on the carriage in position to receive the discharge from the said devices.

BENJAMIN F. WATKINS.